United States Patent [19]
Vo

[11] Patent Number: 5,873,042
[45] Date of Patent: Feb. 16, 1999

[54] SYSTEM AND METHOD OF MULTI-EXCHANGE PARALLEL PAGING IN A RADIO TELECOMMUNICATIONS NETWORK

[75] Inventor: Kim Phuong Vo, Town of Mount Royal, Canada

[73] Assignee: Telefonaktiebolaget LM Ericsson, Stockholm, Sweden

[21] Appl. No.: 668,571

[22] Filed: Jun. 20, 1996

[51] Int. Cl.[6] ........................................... H04Q 7/20
[52] U.S. Cl. ........................... 455/458; 455/445; 455/432
[58] Field of Search ............................... 455/445, 435, 455/31.2, 436, 414, 437, 426, 458, 460, 432

[56] References Cited

U.S. PATENT DOCUMENTS

| | | | |
|---|---|---|---|
| 4,748,655 | 5/1988 | Throwr et al. ........................... | 455/458 |
| 5,153,902 | 10/1992 | Buhl et al. .............................. | 455/458 |
| 5,162,790 | 11/1992 | Jasinski ............................... | 340/825.44 |
| 5,414,750 | 5/1995 | Bhagat et al. ............................ | 379/57 |
| 5,471,644 | 11/1995 | Schatz et al. ........................... | 455/445 |
| 5,479,484 | 12/1995 | Mukerjee et al. ....................... | 379/60 |
| 5,533,094 | 7/1996 | Sanmugam .............................. | 455/31.2 |
| 5,664,005 | 9/1997 | Emery et al. ........................... | 455/435 |
| 5,722,074 | 2/1998 | Muszynski ............................. | 455/436 |

*Primary Examiner*—Edward F. Urban
*Assistant Examiner*—Tilahun Gesesse
*Attorney, Agent, or Firm*—Steven W. Smith

[57] ABSTRACT

A system and method of simultaneously paging a mobile station from a plurality of mobile switching centers (MSCs) in a radio telecommunications network without utilizing a home location register is disclosed. The system and method may be utilized to more rapidly locate a mobile station operating in a roamer port region covered by a plurality of MSCs. When a roamer port call is received in a first MSC in which the roamer port is defined, the first MSC begins paging for the mobile station while simultaneously sending a plurality of paging request messages to each of the other MSCs in the roamer port region. The paging request messages include an indication that the call is a roamer port call, and an indication of the Local Access and Transport Area (LATA) in which paging is requested. Each MSC receiving one of the paging request messages immediately begins paging the mobile station in parallel with other receiving MSCs. If no page response is received, the unsuccessful MSC returns a no response return result message to the first MSC. If a page response is received, the successful MSC returns a routing number for the mobile station in a return result message to the first MSC. The first MSC then routes the roamer port call to the successful MSC.

8 Claims, 2 Drawing Sheets

SYSTEM AND METHOD OF MULTI-EXCHANGE PARALLEL PAGING IN A RADIO TELECOMMUNICATIONS NETWORK

BACKGROUND OF THE INVENTION

1. Technical Field of the Invention

This invention relates to radio telecommunication systems and, more particularly, to a system and method of rapidly locating a mobile station by simultaneously paging in a plurality of exchanges.

2. Description of Related Art

In existing radio telecommunications networks, a metropolitan area may be covered by a plurality of mobile switching centers (MSCs). The service area of each MSC is referred to herein as an exchange. By regulation, one of the MSCs in the metropolitan area is provided with a roamer port. A roamer port is a local telephone number through which local callers in the metropolitan area may call a subscriber from a long distance exchange who has roamed into the metropolitan area. Local callers, thereby, may avoid long distance charges while the roaming subscriber is operating in the metropolitan area.

When a call to the roaming subscriber comes through the roamer port, a mechanism is needed to locate the roaming subscriber who may be roaming within any of the metropolitan exchanges within the roamer port region. In existing radio telecommunications networks, a process known as sequential paging is utilized. In an exemplary existing metropolitan area, there may be 4 local MSCs, (MSC-1 through MSC-4) with the roamer port defined in MSC-1, and a roaming mobile station located in MSC-4. When a roamer port call is received in MSC-1, MSC-1 begins to page for the mobile station in its service area. Paging within MSC-1 may take as long as 12 seconds. If MSC-1 does not receive a page response from within its service area, MSC-1 seizes a trunk and routes the call to MSC-2. This action may take another 1 or 2 seconds. MSC-2 then pages the mobile station in its service area. This process may continue sequentially through each MSC until MSC-4 receives a page response from the mobile station. The total time from receipt of the call in MSC-1 until MSC-4 receives a page response may be as long as 40 seconds, with three inter-exchange trunks seized.

There are several problems with the sequential paging process. First, the sequential paging process is excessively long, and the calling subscriber often hangs up before the paging process can be finished and the call is delivered. Second, the use of system resources is not optimized since inter-exchange trunks must be seized in order to move the paging process to successive MSCs. Third, the sequential paging process produces an uneven paging load in the MSCs in the metropolitan area. MSC-1, in which the roamer port is implemented, has the highest paging load since it must page for every roamer port call. The paging load is progressively lighter in each subsequent MSC.

Although there are no known prior art teachings of a solution to the aforementioned deficiency and shortcoming such as that disclosed herein, U.S. Pat. No. 5,153,902 to Buhl et al. (Buhl) discusses subject matter that bears some relation to matters discussed herein. Buhl discloses a multi-exchange paging system for locating a mobile telephone in a wide area telephone network. In Buhl, a call from the Public Switch Telephone Network (PSTN) is first routed to a gateway mobile switching center (G-MSC). The G-MSC then interrogates a home location register (HLR) for location information regarding the mobile station. The HLR sends, either sequentially or simultaneously, requests to multiple MSCs to locate the mobile station. MSCs which are unsuccessful in locating the mobile station return "no-page-response" messages to the G-MSC. The MSC which has successfully paged the mobile station returns a routing number to the G-MSC. The G-MSC then routes the call to the successful MSC.

Buhl, however, requires the use of a HLR. If the mobile station is from a foreign network, the HLR associated with the mobile station will require long distance signaling from the G-MSC. Long distance interrogation of HLRs is not acceptable to system operators for roamer port calls. Buhl does not teach or suggest a system or method of multi-exchange location without utilizing a HLR.

Review of the foregoing reference reveals no disclosure or suggestion of a system or method such as that described and claimed herein.

In order to overcome the disadvantage of existing solutions, it would be advantageous to have a multi-exchange paging system that simultaneously pages for a mobile station in a plurality of exchanges without utilizing a home location register. The present invention provides such a system and method.

SUMMARY OF THE INVENTION

In one aspect, the present invention is a system in a radio telecommunications network, for simultaneously paging a mobile station from a plurality of mobile switching centers (MSCs) without utilizing a home location register. The system includes means for receiving a roamer port call for the mobile station in a first MSC, means for paging the mobile station from the first MSC, and means for simultaneously sending a plurality of paging request messages from the first MSC to each of the other plurality of MSCs. The paging request messages may include an indication that the call is a roamer port call as well as an indication of the Local Access and Transport Area (LATA) in which paging is requested. The system also includes means within each of the plurality of MSCs for paging the mobile station in response to receiving one of the paging request messages, means within each of the plurality of MSCs for sending paging response messages to the first MSC and means for routing the call from the first MSC to one of the plurality of MSCs that received a page response from the mobile station.

In another aspect, the present invention is a method in a radio telecommunications network, of simultaneously paging a mobile station from a plurality of mobile switching centers (MSCs) without utilizing a home location register. The method begins by receiving a call for the mobile station in a first MSC, paging the mobile station from the first MSC, and simultaneously sending a plurality of paging request messages from the first MSC to each other of the plurality of MSCs. The method continues by paging within each of the plurality of MSCs for the mobile stations in response to receiving one of the paging request messages, sending, from each of the plurality of MSCs, paging response messages to the first MSC, and routing the call from the first MSC to one of the plurality of MSCs that received a page response from the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
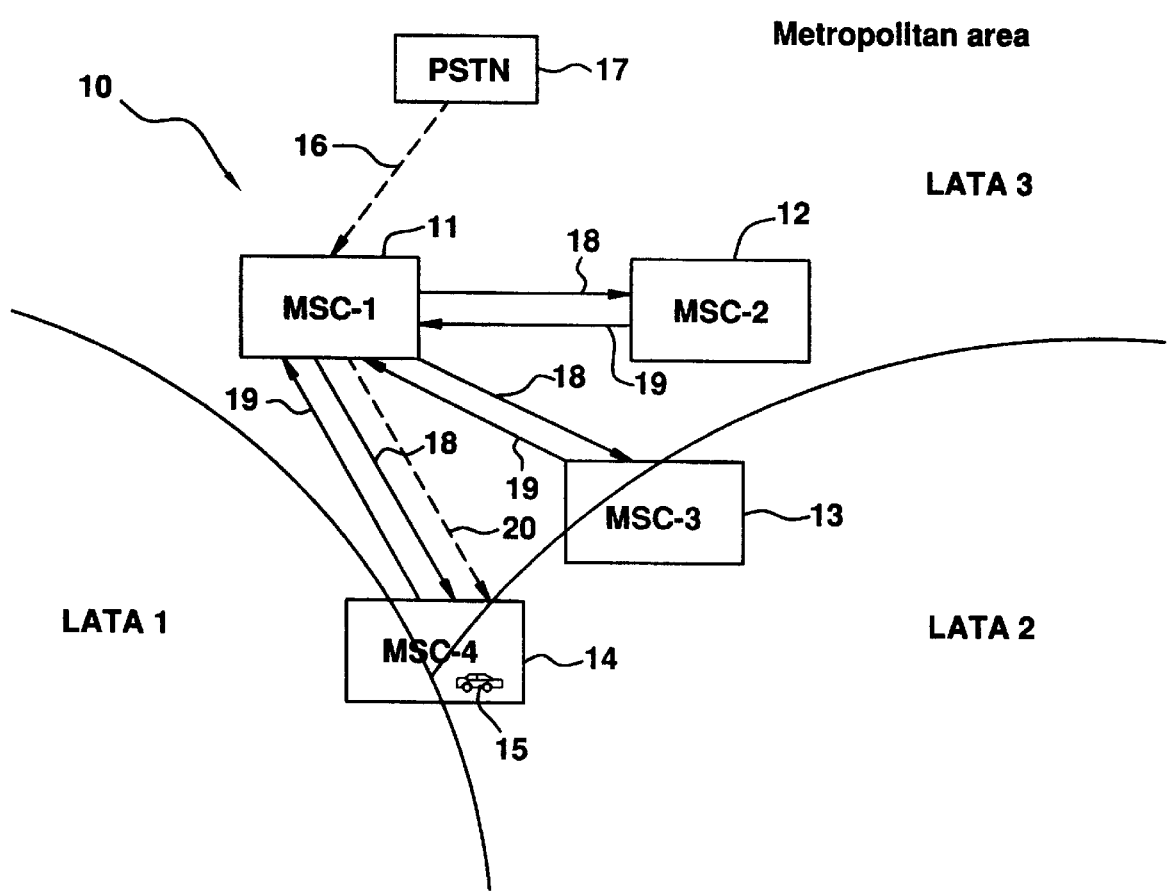
FIG. 1 (Prior Art) is a simplified block diagram of a portion of a radio telecommunications network covering a metropolitan area in which the system of the present invention has been implemented.

FIG. 1 is a simplified block diagram of a portion of a radio telecommunications network 10 covering a metropolitan area in which the system of the present invention has been implemented. In the exemplary metropolitan area illustrated, there is shown to be 4 local MSCs (MSC-1 through MSC-4) 11–14, respectively, with the roamer port defined in MSC-1, and a roaming mobile station 15 located in MSC-4. However, this configuration is illustrated for exemplary purposes only, and a greater or lesser number of MSCs may be located in a given metropolitan area. When a roamer port call 16 is received in MSC-1 from, for example, the PSTN 17, MSC-1 begins to page for the called mobile station 15 in its service area. At the same time, MSC-1 sends modified Intersystem Page Invoke messages 18 simultaneously to MSC-2, MSC-3, and MSC-4 in the roamer port region. The Intersystem Page Invoke messages 18 may be sent through exchange data simultaneously with the first page attempt or immediately following the first page. The intersystem signaling protocol may be in accordance with IS-41, which is hereby incorporated by reference herein.

The first page may be set to a maximum of 8 seconds. The Intersystem Page messages only require approximately another 1/100th of a second. MSC-2, MSC-3, and MSC-4 each begin to simultaneously page for the mobile station 15 within their respective service areas. Each MSC sends an Intersystem Page Return Result message 19 back to MSC-1 indicating that either no response was received, or returning a routing number if a response was received. It may typically require another 5 seconds or so for MSC-4 to receive a page response from the mobile station 15, assign a voice channel, and return a routing number to MSC-1. With another 1 or 2 seconds required to seize a trunk 20 from MSC-1 to MSC-4 and route the call to MSC-4, the total time from receipt of the call in MSC-1 until call delivery is less than 15 seconds.

The Intersystem Page messages are modified to identify the call as a roamer port call and to carry Local Access and Transport Area (LATA) information. The LATA information enables the paging process to be restricted to a single LATA. If one of the MSCs covers more than one LATA that MSC pages for the mobile station only in those cells that are within the same LATA as MSC-1.

Figure 2:
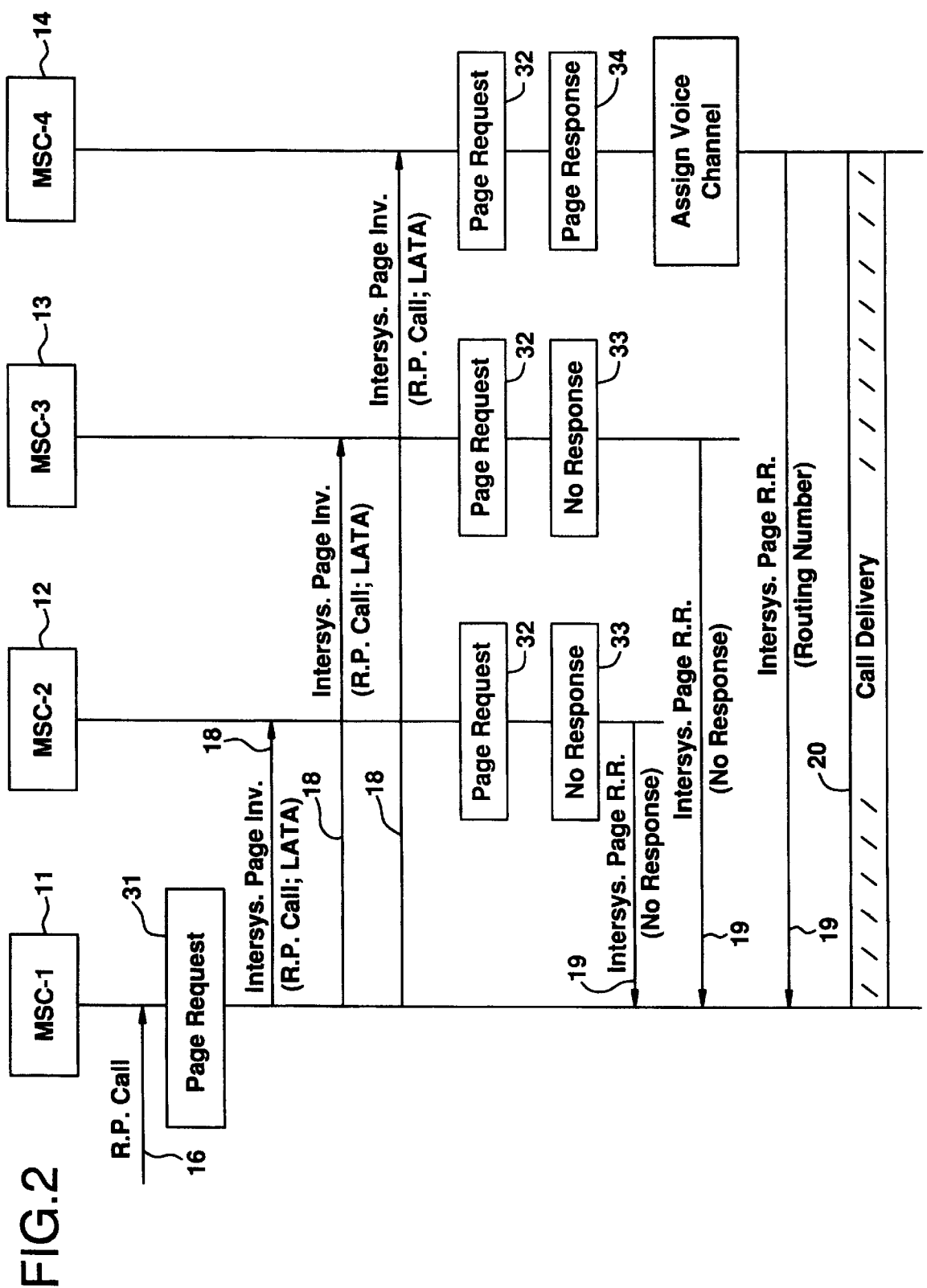
FIG. 2 is a signaling diagram illustrating the interexchange signaling messages involved in the preferred embodiment of the method of the present invention.

FIG. 2 is a signaling diagram illustrating the interexchange signaling messages involved in the preferred embodiment of the method of the present invention. Still using the exemplary metropolitan area of FIG. 1 as an example, it is shown that a roamer port (RP) call 16 is received in MSC-1 (11). MSC-1 begins to page for the mobile station 15 in its own service area at 31. MSC-1 then sends Intersystem Page Invoke messages 18 to MSC-2 (12), MSC-3 (13) and MSC-4 (14) either through exchange data simultaneously with the first page request 31 or immediately following the first page request. Each MSC receiving an Intersystem Page Invoke message 18 begins to page for the mobile station in its respective service area at 32. As illustrated in the example of FIG. 2, no response is received in MSC-2 and MSC-3 at 33. However, a page response is received in MSC-4 at 34.

MSC-2, MSC-3, and MSC-4 each then return a Intersystem Page Return Result message 19 to MSC-1. The messages from MSC-2 and MSC-3 indicate that no page response was received. The Intersystem Page Return Result message from MSC-4 includes the routing number (temporary location directory number) for the mobile station 15. A trunk 20 is then seized from MSC-1 to MSC-4, and call delivery is completed.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network, a system for simultaneously paging a mobile station from a plurality of mobile switching centers (MSCs) without utilizing a home location register, said system comprising:

means for receiving a call for said mobile station in a first MSC;

means for paging said mobile station from said first MSC;

means for simultaneously sending a plurality of paging request messages from said first MSC to each other of said plurality of MSCs without utilizing a home location register;

means within each of said plurality of MSCs for paging said mobile station in response to receiving one of said paging request messages;

means within each of said plurality of MSCs for sending paging response messages to said first MSC; and means for routing said call from said first MSC to one of said plurality of MSCs that received a page response from said mobile station.

2. The system for simultaneously paging a mobile station from a plurality of mobile switching centers (MSCs) of claim 1 wherein said call is a roamer port call.

3. The system for simultaneously paging a mobile station from a plurality of mobile switching centers (MSCs) of claim 2 wherein said paging request messages include an indication that said call is a roamer port call.

4. The system for simultaneously paging a mobile station from a plurality of mobile switching centers (MSCs) of claim 3 wherein said paging request messages include an indication of the Local Access and Transport Area (LATA) in which paging is requested.

5. In a radio telecommunications network, a method of simultaneously paging a mobile station from a plurality of mobile switching centers (MSCs) without utilizing a home location register, said method comprising the steps of:

receiving a call for said mobile station in a first MSC;

paging said mobile station from said first MSC;

simultaneously sending a plurality of paging request messages from said first MSC to each other of said plurality of MSCs without utilizing a home location register;

paging within each of said plurality of MSCs for said mobile station in response to receiving one of said paging request messages;

sending, from each of said plurality of MSCs, paging response messages to said first MSC; and routing said call from said first MSC to one of said plurality of MSCs that received a page response from said mobile station.

6. The method of simultaneously paging a mobile station from a plurality of mobile switching centers (MSCs) of claim 5 wherein said step of receiving a call for said mobile station in a first MSC includes receiving a roamer port call.

7. The method of simultaneously paging a mobile station from a plurality of mobile switching centers (MSCs) of claim 6 wherein said step of simultaneously sending a plurality of paging request messages from said first MSC to each other of said plurality of MSCs includes sending paging request messages that include an indication that said call is a roamer port call.

8. The method of simultaneously paging a mobile station from a plurality of mobile switching centers (MSCs) of claim 7 wherein said step of simultaneously sending a plurality of paging request messages from said first MSC to each other of said plurality of MSCs includes sending paging request messages that include an indication of the Local Access and Transport Area (LATA) in which paging is requested.

* * * * *